United States Patent
Kita

(10) Patent No.: US 11,238,578 B2
(45) Date of Patent: Feb. 1, 2022

(54) FOIL-STAMPED PRINT INSPECTION APPARATUS, FOIL-STAMPED PRINT INSPECTION SYSTEM, METHOD OF INSPECTING FOIL-STAMPED PRINT, AND NON-TRANSITORY COMPUTER-READABLE STORAGE MEDIUM STORING PROGRAM

(71) Applicant: KONICA MINOLTA, INC., Tokyo (JP)

(72) Inventor: Koji Kita, Machida (JP)

(73) Assignee: KONICA MINOLTA, INC., Tokyo (JP)

( * ) Notice: Subject to any disclaimer, the term of this patent is extended or adjusted under 35 U.S.C. 154(b) by 138 days.

(21) Appl. No.: 16/705,584

(22) Filed: Dec. 6, 2019

(65) Prior Publication Data

US 2020/0184631 A1 Jun. 11, 2020

(30) Foreign Application Priority Data

Dec. 11, 2018 (JP) .............................. JP2018-231956

(51) Int. Cl.
*G06T 7/00* (2017.01)

(52) U.S. Cl.
CPC .. *G06T 7/0004* (2013.01); *G06T 2207/30144* (2013.01)

(58) Field of Classification Search
CPC .................. G06T 2207/30144; G06T 7/0004
See application file for complete search history.

(56) References Cited

U.S. PATENT DOCUMENTS

| 2007/0012775 A1* | 1/2007 | Cote | ....................... B32B 37/02 |
| | | | 235/435 |
| 2017/0329502 A1* | 11/2017 | Wu | ........................ G16H 30/40 |

FOREIGN PATENT DOCUMENTS

| JP | H0999613 A | 4/1997 |
| JP | 2002039729 A | 2/2002 |
| JP | 2011247805 A | 12/2011 |
| JP | 2014009996 A | 1/2014 |

* cited by examiner

*Primary Examiner* — Sam Bhattacharya
(74) *Attorney, Agent, or Firm* — Buchanan Ingersoll & Rooney PC

(57) ABSTRACT

A foil-stamped print inspection apparatus includes: a region selecting unit that selects a foil-stamped region based on data for inspection for a printed material; and an inspection unit that inspects a foil-stamped state of the printed material and determines that foil is unsatisfactory if the foil-stamped region in an image acquired by reading the printed material has a gray level that falls outside a predetermined range. A method of inspecting foil-stamped print includes: a region selecting step of selecting a foil-stamped region based on data for inspection for a printed material; and an inspecting step of inspecting a foil-stamped state of the printed material and determining that foil is unsatisfactory if the foil-stamped region in an image acquired by reading the printed material has a gray level that falls outside a predetermined range.

15 Claims, 13 Drawing Sheets

FIG. 3

```
JOB SETTINGS                                          ─── Djb

PRINT SETTINGS                                        ─── Dpr
   PRINT SIDE                    SINGLE SIDE
   SHEET SIZE                    A3
   DATA FOR PRINTING

DECORATION SETTINGS                                   ─── Dor
   DECORATIVE REGION             LAYER
   TYPE OF DECORATION            GOLD FOIL
   THICKNESS OF VARNISH          INTERMEDIATE
   DATA FOR DECORATION

INSPECTION SETTINGS                                   ─── Dex
   PRINT INSPECTION              ON
   INSPECTION ACCURACY           HIGH
   DECORATION INSPECTION         ON
   COLOR OF PRIMARY COATING      ON: AUTOMATIC
   INSPECTION ACCURACY              INTERMEDIATE
   DATA FOR INSPECTION
   CORRECT IMAGE DATA
```

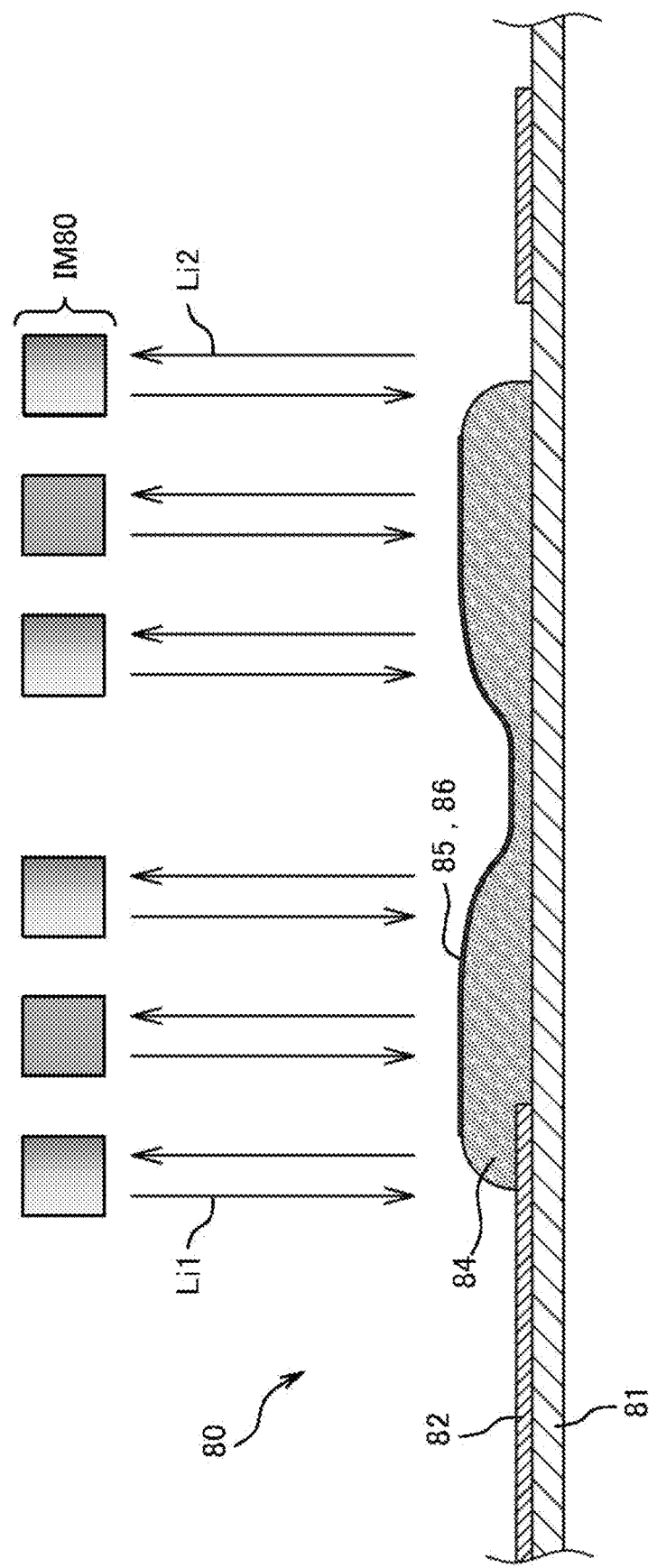

NG: CHIPPED FOIL
PRIMARY COATING IS EXPOSED

NG: CHIPPED FOIL
PRIMARY COATING IS EXPOSED

NG: EXCESSIVE FOIL (THICKNESS OF VARNISH: LARGE)

(THICKNESS OF VARNISH: SMALL)

FOIL-STAMPED PRINT INSPECTION APPARATUS, FOIL-STAMPED PRINT INSPECTION SYSTEM, METHOD OF INSPECTING FOIL-STAMPED PRINT, AND NON-TRANSITORY COMPUTER-READABLE STORAGE MEDIUM STORING PROGRAM

CROSS-REFERENCE TO RELATED APPLICATION

This application claims the benefit of foreign priority to Japanese Patent Application No. 2018-231956 filed Dec. 11, 2018, which is incorporated by reference in its entirety.

TECHNOLOGICAL FIELD

The present invention relates to a foil-stamped print inspection apparatus, a foil-stamped print inspection system, a method of inspecting a foil-stamped print, and a non-transitory computer-readable storage medium storing a program.

BACKGROUND

Printed materials with decoration such as foil-stamping have been widely spread. The term "foil-stamping" means a process by which decorative foils are applied to a surface of a medium. Foil-stamping is carried out, for example, by applying varnish serving as adhesive (glue) on a medium, and by disposing foil on the varnish while pressing the foil, and finally by irradiating ultraviolet light to cure the varnish.

Conventionally, visual inspection has been carried out for a printed material to which decoration such as foil-stamping has been applied, so as to inspect (check) whether the printed material is satisfactory. However, since the inspection relies on operator's visual perception, it requires relatively long time.

For this reason, various inspection apparatuses for automatically inspecting (checking) a printed material have been proposed so that the inspection can be performed without relying on operator's visual perception. As inspection apparatuses of this kind, for example, the following apparatuses have been proposed.

Japanese Patent Publication No. H09-99613 A discloses an inspection apparatus, in which whether foil is properly applied on a medium is detected by irradiating the foil with light while displacing a light source.

Japanese Patent Publication No. 2011-247805 A discloses an inspection apparatus, in which whether foil is properly applied on a medium is detected by irradiating the foil with infrared light.

Japanese Patent Publication No. 2002-39729 A discloses an inspection apparatus, in which whether foil is properly applied on a medium is detected based on a shape after the foil has been peeled from a sheet.

Further, Japanese Patent Publication No. 2014-9996 A discloses an inspection apparatus configured to compare a master image, in which a characteristic group consisting of two or more characteristic portions is set, and a detected surface of a printed material to detect whether the detected surface has a defect.

The above-described conventional inspection apparatuses are required to provide a dedicated mechanism in each of the inspection apparatus as described below. This disadvantageously makes the inspection apparatus complicated and expensive.

For example, the conventional inspection apparatus disclosed in JP-H09-99613-A requires a mechanism for displacing the light source, so that the whole mechanism of the inspection apparatus is complicated and the inspection apparatus is costly.

For example, the conventional inspection apparatus disclosed in JP-2011-247805-A requires a mechanism for detecting foil while irradiating the foil with infrared light, so that the whole mechanism of the inspection apparatus is complicated and the inspection apparatus is costly.

For example, the conventional inspection apparatus disclosed in JP-2002-39729-A requires a mechanism for detecting a sheet after the foil has been peeled from the sheet, so that the whole mechanism of the inspection apparatus is complicated and the inspection apparatus is costly.

For example, the conventional inspection apparatus disclosed in JP-2014-9996-A is applicable for the case where the position and the shape of foil are constant, but not applicable for the case where the position or the shape of the foil is varied. For this reason, it is necessary to provide a dedicated mechanism for making the inspection apparatus applicable for the case where the position or the shape of the foil is varied, so that the whole mechanism of the inspection apparatus is complicated and the inspection apparatus is costly.

In view of the above, the present invention seeks to provide a foil-stamped print inspection apparatus, a foil-stamped print inspection system, a method of inspecting foil-stamped print, and a non-transitory computer-readable storage medium storing a program, which can perform appropriate inspection of a printed material with an inexpensive and relatively simple configuration.

SUMMARY

To achieve at least one of the abovementioned objects, according to an aspect of the present invention, there is provided a foil-stamped print inspection apparatus comprising: a region selecting unit that selects a foil-stamped region based on data for inspection for a printed material; and an inspection unit that inspects a foil-stamped state of the printed material and determines that foil is unsatisfactory if the foil-stamped region in an image acquired by reading the printed material has a gray level that falls outside a predetermined range.

According to another aspect of the present invention, there is provided a foil-stamped print inspection system comprising: a printer that prints an image on a medium; a foil-stamping apparatus that applies foil-stamping on the medium; and the foil-stamped print inspection apparatus according to claim 1, wherein the printer prints a foil-stamped region of the printed material with a color having a gray level that is different from the predetermined range of gray levels.

According to a still another aspect of the present invention, there is provided a method of inspecting foil-stamped print comprising: a region selecting step of selecting a foil-stamped region based on data for inspection for a printed material; and an inspecting step of inspecting a foil-stamped state of the printed material and determining that foil is unsatisfactory if the foil-stamped region in an image acquired by reading the printed material has a gray level that falls outside a predetermined range.

According to a further aspect of the present invention, there is provided a non-transitory computer-readable storage medium storing a program for causing a computer to perform: a region selection processing of selecting a foil-stamped region based on data for inspection for a printed material; and an inspection processing of inspecting a foil-stamped state of the printed material and determining that foil is unsatisfactory if the foil-stamped region in an image acquired by reading the printed material has a gray level that falls outside a predetermined range.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a view explaining job setting data used in this embodiment.

FIG. 4 is a view illustrating a scanned image of a printed material.

DETAILED DESCRIPTION OF EMBODIMENTS

Figure 1:
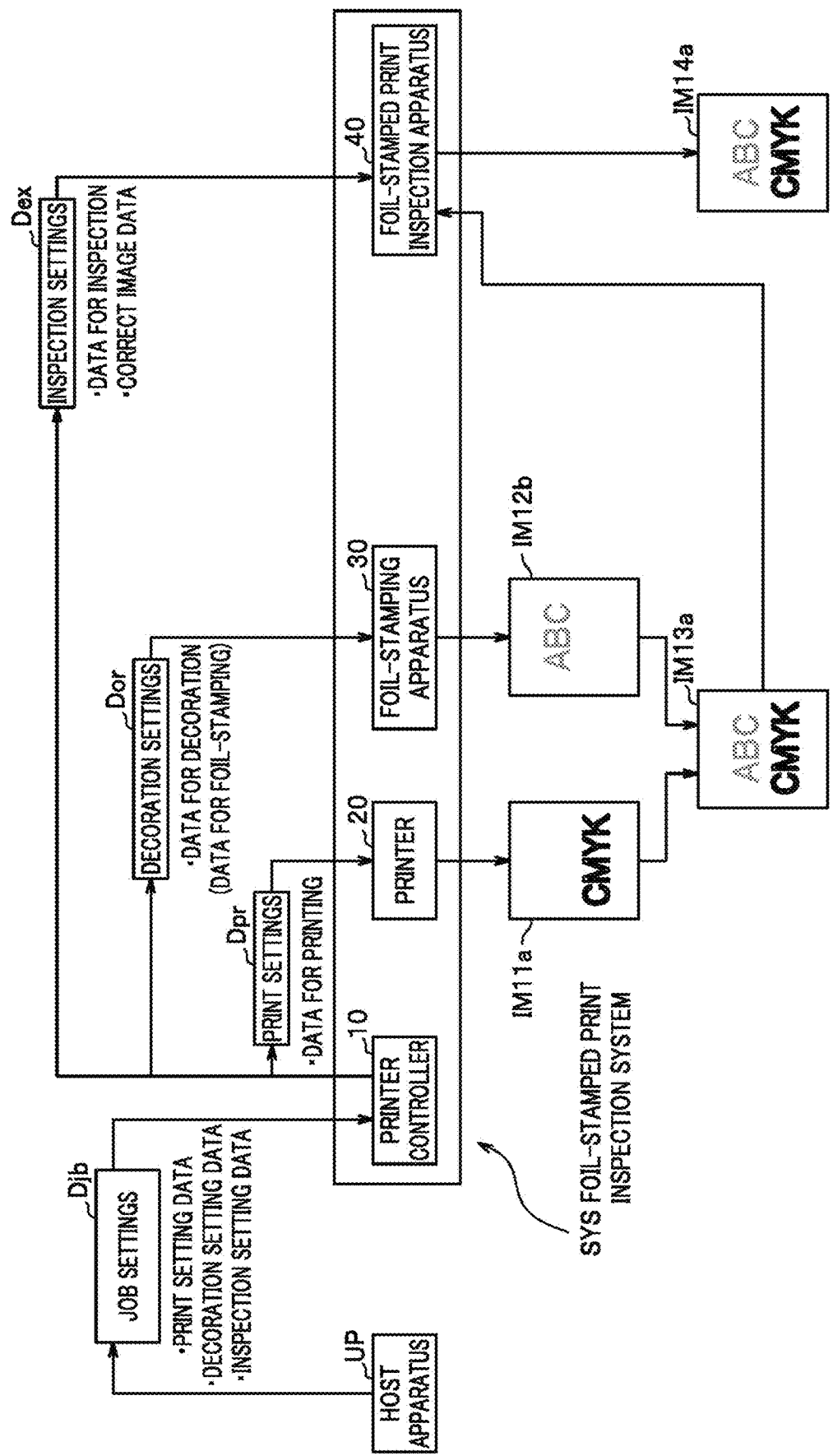
FIG. 1 is a schematic diagram illustrating an overall configuration of a foil-stamped print inspection system according to one embodiment and the operation thereof.

Embodiments of the present invention will be described in detail with reference to the drawings. It is noted that each of the drawings schematically illustrates the embodiments to such an extent that the present invention is sufficiently understood. It is to be understood that the present invention is not limited to the illustrated embodiments. In the drawings, same or similar parts are indicated by same reference numerals, and duplicated explanation thereof will be omitted.

Embodiment

Overall Configuration of Foil-Stamped Print Inspection System and Operation Thereof With reference to FIG. 1, the overall configuration of a foil-stamped print inspection system SYS according to one embodiment of the present invention and the operation thereof will be briefly described. FIG. 1 is a schematic diagram illustrating the overall configuration of the foil-stamped print inspection system SYS according to this embodiment and the operation thereof.

Foil-stamping is one specific embodiment of decoration (a process for applying a special decorative effect on a surface of a medium). The term "foil-stamping" means a process for applying on a surface of a medium colored metallic foils such as gold foil, silver foil and other colored foils (e.g., red), patterned foils with patterns, and other foils. For example, a medium may be made of paper material, fabric, synthetic resin, and other material. In this embodiment, the medium is a sheet of paper (hereinafter simply referred to as a sheet) made of paper material.

As seen in FIG. 1, the foil-stamped print inspection system SYS includes a printer controller 10, a printer 20, a foil-stamping apparatus 30, and a foil-stamped print inspection apparatus 40.

The printer controller 10 is an apparatus for controlling a printing operation and a foil-stamping operation. The printer 20 is an apparatus for printing any desired image on a sheet (medium). The foil-stamping apparatus 30 is an apparatus for applying foil-stamping on a sheet (medium). The foil-stamped print inspection apparatus 40 is an apparatus for inspecting a state of foil-stamped foil.

A foil-stamped print inspection system SYS shown in FIG. 1 includes one foil-stamping apparatus 30. However, the foil-stamped print inspection system SYS may include a plurality of foil-stamping apparatuses 30. Accordingly, the foil-stamped print inspection system SYS can operate, for example, to concurrently foil-stamp a plurality of regions of a sheet, and to apply different types of foil-stamping to respective regions of a sheet. Preferably, the foil-stamped print inspection system SYS includes a plurality of foil-stamped print inspection apparatuses 40. With this configuration, the foil-stamped print inspection system SYS can operate, for example, to concurrently inspect a printed material in accordance with types of foil-stamping, and to concurrently inspect a printed material in accordance with regions.

The printer controller 10 acquires job setting data Djb from a host apparatus UP that is communicably connected by wire or wirelessly to the printer controller 10. In this embodiment, the job setting data Djb contains data, such as print setting data, decoration setting data, and inspection setting data. It is however noted that instead of the job setting data Djb containing the inspection setting data, the inspection setting data may be derived from the printer controller 10 or the foil-stamped print inspection apparatus 40 based on the job setting data Djb or other data.

The print setting data is data for causing the printer 20 to print any desired image. The print setting data contains data for printing that indicates drawing contents of an image to be printed by the printer 20. Herein, an image to be printed based on the data for printing is referred to as a "normal image". Further, a region of a sheet in which a normal image is to be printed is referred to as a "normal region".

The decoration setting data is data for causing the foil-stamping apparatus 30 to apply decoration such as foil-stamping. The decoration setting data contains data for decoration that indicates drawing contents of a foil-stamped image to be formed by the foil-stamping apparatus 30. Herein, an image to be formed based on the data for decoration is referred to as a "decorative image". Further, a region of a sheet in which the decorative image is to be formed is referred to as a "decorative region". In this embodiment, the "decorative image" may be referred to as a "foil-stamped image", and the "decorative region" may be referred to as a "foil-stamped region" because a type of decoration is foil-stamped.

The inspection setting data is data for causing the foil-stamped print inspection apparatus 40 to inspect a printed material. Herein, the term "printed material" means a sheet (medium) on which a normal image and/or a decorative image (foil-stamped image) are formed. In this embodiment, the inspection setting data contains data for inspection that indicates inspection contents to be inspected by the foil-stamped print inspection apparatus 40, and collect image data indicating a correct image. Herein, the term "correct image" means an image for determining (judging) whether a printed material is satisfactory. The foil-stamped print inspection apparatus 40 determines (judges) whether a printed material is satisfactory, for example, by comparing a normal image of the printed material and a correct image of the printed material. According to this embodiment, the data for inspection contains, for example, type data indicating a type of decoration (foil), and decorative region data (foil-stamped region data) indicating a decorative region (foil-stamped region) of an inspection target in accordance with a type of decoration (foil). The foil-stamped print inspection apparatus 40 determines (judges) whether a printed material is satisfactory, also by determining whether an image on a foil-stamped region of an inspection target (hereinafter referred also to an "inspection region") satisfies a determination criterion generated in accordance with a type of decoration (foil).

The printer controller 10 outputs print setting data Dpr to the printer 20 to cause the printer 20 to print an image based on the print setting data Dpr. In this instance, a normal image IM11a is formed on a surface of a sheet as seen in FIG. 1 for instance.

Further, the printer controller 10 outputs decoration setting data Dor to the foil-stamping apparatus 30 to cause the foil-stamping apparatus 30 to apply foil-stamping based on the decoration setting data Dor. In this instance, a foil-stamped image IM12a is formed on a surface of a sheet as seen in FIG. 1 for instance.

As a result, a printed material having a composite image IM13a formed on a surface thereof is produced; the composite image IM13a is created from the normal image IM11a and the foil-stamped image IM12a.

Further, the printer controller 10 outputs inspection setting data Dex to the foil-stamped print inspection apparatus 40 to cause the foil-stamped print inspection apparatus 40 to inspect (check) the printed material based on the inspection setting data Dex. In this instance, the foil-stamped print inspection apparatus 40 acquires a correct image from correct image data contained in the inspection setting data Dex. After that, as seen in FIG. 1 for instance, the foil-stamped print inspection apparatus 40 reads an image of the printed material (composite image IM13a) using an image scanner 43 (see FIG. 2D) to be described later to acquire a scanned image IM14a (read image). The foil-stamped print inspection apparatus 40 then compares the scanned image IM14a and the correct image to inspect (check) the printed material. The foil-stamped print inspection apparatus 40 determines (judges) whether the printed material is satisfactory, also by determining whether an image on an inspection region contained in the scanned image IM14a satisfies a determination criterion generated in accordance with a type of decoration (foil).

Configurations of Each Apparatus

Figure 2A:
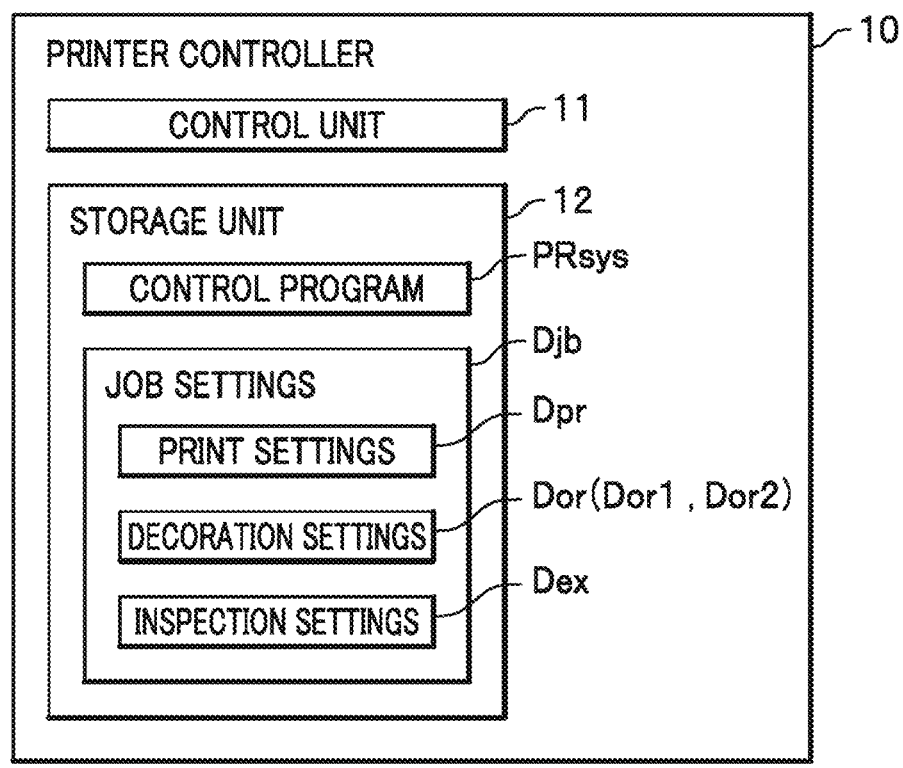
FIG. 2A is a block diagram illustrating a configuration of a printer controller used in this embodiment.
Figure 2B:
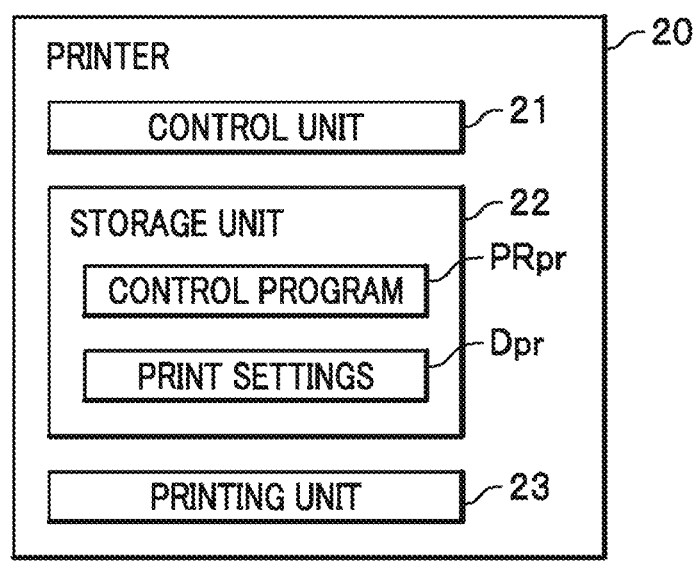
FIG. 2B is a block diagram illustrating a configuration of a printer used in this embodiment.
Figure 2C:
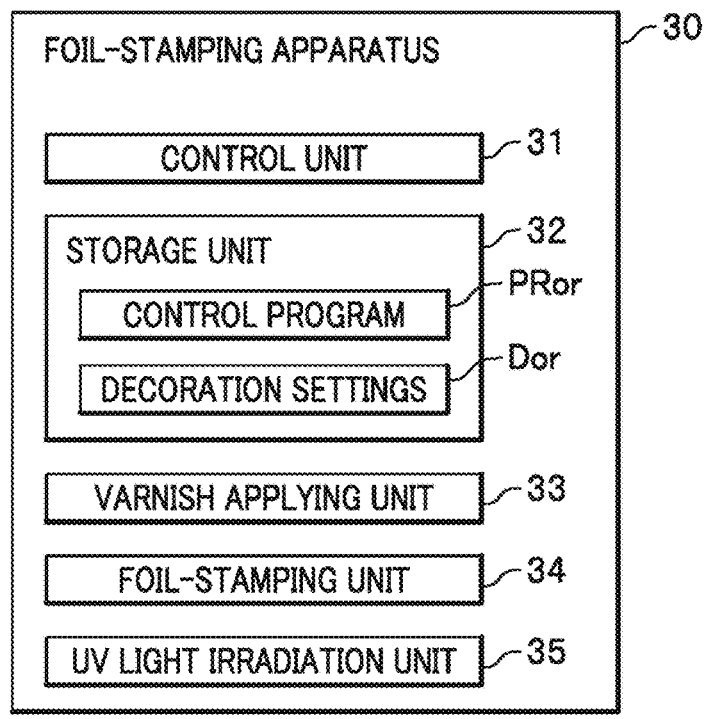
FIG. 2C is a block diagram illustrating a configuration of a foil-stamping apparatus used in this embodiment.
Figure 2D:
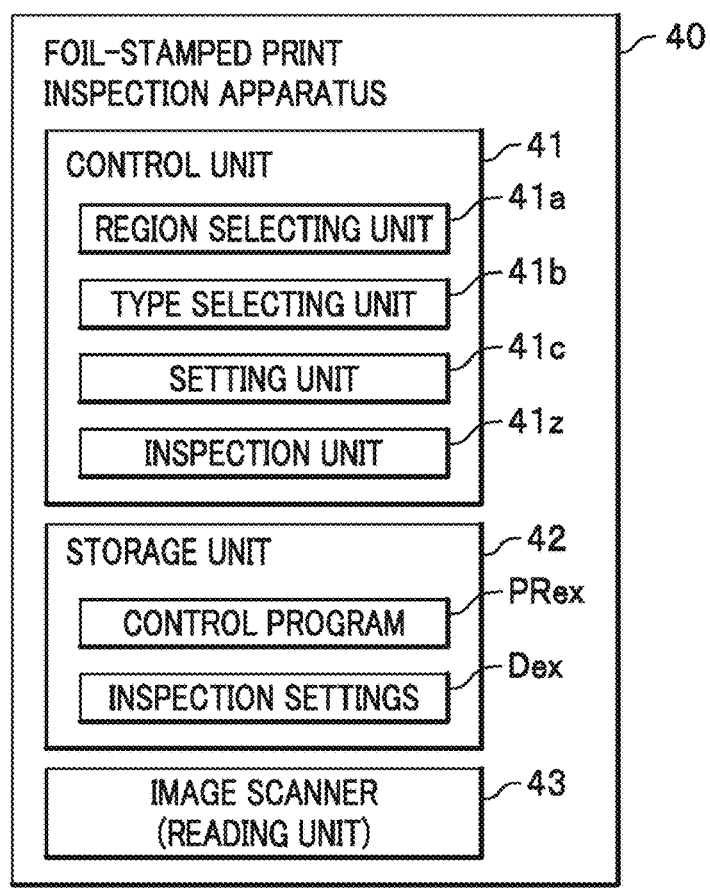
FIG. 2D is a block diagram illustrating a configuration of a foil-stamped print inspection apparatus used in this embodiment.

With reference to FIGS. 2A to 2D, the configuration of each of the apparatuses will be described below. FIG. 2A is a block diagram illustrating the configuration of the printer controller 10. FIG. 2B is a block diagram illustrating the configuration of the printer 20. FIG. 2C is a block diagram illustrating the configuration of the foil-stamping apparatus 30. FIG. 2D is a block diagram illustrating the configuration of the foil-stamped print inspection apparatus 40.

As seen in FIG. 2A, the printer controller 10 includes a control unit 11 and a storage unit 12. The control unit 11 includes a CPU (central processing unit). The storage unit 12 includes a ROM (read only memory), a RAM (random access memory), and the like.

The storage unit 12 stores in advance a control program PRsys for controlling and regulating the entire operation of the foil-stamped print inspection system SYS. The storage unit 12 also stores job setting data Djb outputted from the host apparatus UP (see FIG. 1) to the printer controller 10 when a printed material is produced. The control unit 11 performs operations about producing a printed material and inspecting the printed material based on the control program PRsys previously stored in the storage unit 12.

The control program PRsys is a computer-readable program previously stored in a non-transitory computer-readable storage medium (not shown), and is installed in the storage unit 12 from the storage medium. Accordingly, the control program PRsys is stored in the storage unit 12 of the printer controller 10.

As seen in FIG. 2B, the printer 20 includes a control unit 21, a storage unit 22, and a printing unit 23. The control unit 21 includes a CPU. The storage unit 22 includes a ROM, a RAM, and the like. The printing unit 23 is a mechanism for printing. The printing unit 23 is formed, for example, by an ink jet-type image forming unit or an electrophotographic-type image forming unit.

The storage unit 22 stores in advance a control program PRpr for controlling and regulating an operation of the printer 20. The storage unit 22 also stores print setting data Dpr outputted from the printer controller 10 to the printer 20 when a printed material is produced. The control unit 21 performs an operation about printing of a normal image based on the control program PRpr previously stored in the storage unit 22.

The control program PRpr is a computer-readable program previously stored in a non-transitory computer-readable storage medium (not shown), and is installed in the storage unit 22 from the storage medium. Accordingly, the control program PRpr is stored in the storage unit 22 of the printer 20.

As seen in FIG. 2C, the foil-stamping apparatus 30 includes a control unit 31, a storage unit 32, a varnish applying unit 33, a foil-stamping unit 34, and a UV light irradiation unit 35. The control unit 31 includes a CPU. The storage unit 32 includes a ROM, a RAM, and the like. The varnish applying unit 33 is a mechanism for applying a surface of a sheet with varnish that serves as adhesive. The foil-stamping unit 34 is a mechanism for performing foil-stamping. The UV light irradiation unit 35 is a mechanism for irradiating a sheet on which foil-stamping has been made with ultraviolet light to cure the varnish.

The storage unit 32 stores in advance a control program PRor for controlling and regulating the operation of the foil-stamping apparatus 30. The storage unit 32 also stores decoration setting data Dor outputted from the printer controller 10 to the foil-stamping apparatus 30 when a printed material is produced. The control unit 31 performs an operation about decoration (foil-stamping in this embodiment) based on the control program PRor previously stored in the storage unit 32.

The control program PRor is a computer-readable program previously stored in a non-transitory computer-readable storage medium (not shown), and is installed in the storage unit 32 from the storage medium. Accordingly, the control program PRor is stored in the storage unit 32 of the foil-stamping apparatus 30.

As seen in FIG. 2D, the foil-stamped print inspection apparatus 40 includes a control unit 41, a storage unit 42, and an image scanner 43. The control unit 41 includes a CPU. The storage unit 42 includes a ROM, a RAM, and the like. The image scanner 43 is a reading unit, by which an image of a printed material is read to acquire a scanned image (read image). The image scanner 43 includes a light emitting portion (not shown) for irradiating a printed material with light, and a line sensor (not shown) for receiving light reflected from a surface of a printed material to acquire a scanned image of the printed material.

The storage unit 42 stores in advance a control program PRex for controlling and regulating an operation of the foil-stamped print inspection apparatus 40. The storage unit 42 also stores inspection setting data Dex outputted from the printer controller 10 to the foil-stamped print inspection apparatus 40 when a printed material is inspected. The control unit 41 performs an operation about inspection of a printed material based on the control program PRex previously stored in the storage unit 42. In this embodiment, inspection of a printed material is carried out immediately following creation of the printed material, substantially at the timing same as producing of the printed material.

The control program PRex is a computer-readable program previously stored in a non-transitory computer-readable storage medium (not shown), and is installed in the storage unit 42 from the storage medium. Accordingly, the control program PRex is stored in the storage unit 42 of the foil-stamped print inspection apparatus 40.

According to this embodiment, the foil-stamped print inspection apparatus 40 is configured to read a decorative region (foil-stamped region in this embodiment) and a normal region of a printed material at once, while conveying the printed material, using the line sensor of the image scanner 43.

The control unit 41 of the foil-stamped print inspection apparatus 40 serves as a region selecting unit 41a, a type selecting unit 41b, a setting unit 41c, and an inspection unit 41z by carrying out the control program PRex previously stored in the storage unit 42.

The region selecting unit 41a is a functional unit for selecting a decorative region of decoration (foil-stamped region regarding foil-stamping in this embodiment) from a scanned image of a printed material based on data for inspection for the printed material.

The type selecting unit 41b is a functional unit for selecting a type of decoration (foil) of an inspection target based on data for inspection for a printed material.

The setting unit 41c is a functional unit for setting a determination criterion in accordance with a type of decoration (foil). Preferably, the setting unit 41c is configured to automatically generate a determination criterion based on a type of decoration (foil).

The inspection unit 41z is a functional unit for inspecting a state of decoration (foil).

Configuration of Job Setting Data

With reference to FIG. 3, the configuration of job setting data Djb will be described below. FIG. 3 is a view explaining job setting data Djb.

As seen in FIG. 3, according to this embodiment, the job setting data Djb contains print setting data Dpr, decoration setting data Dor, and inspection setting data Dex.

In the example shown in FIG. 3, the print setting data Dpr contains data indicating that the print side is a "single side", and the sheet size is "A3". Further, the print setting data Dpr contains data for printing that indicates drawing contents of a normal image to be printed by the printer 20.

Further, in the example shown in FIG. 3, the decoration setting data Dor contains layer data that indicates a decorative region, and data instructing that the type of decoration is "gold foil" and the thickness of varnish is an "intermediate" level. The decoration setting data Dor also contains data for decoration that indicates drawing contents of a foil-stamped image to be created by the foil-stamping apparatus 30.

Further, in the example shown in FIG. 3, the inspection setting data Dex contains data instructing that print inspection is "ON" and inspection accuracy is a "high" level, and data instructing that the decoration inspection is "ON", a color of a primary coating is "ON: Automatic", and inspection accuracy is an "intermediate" level. Further, the inspection setting data Dex contains data for inspection that indicates inspection contents to be inspected by the foil-stamped print inspection apparatus 40, and correct image data that indicates a correct image used for determining (judging) whether a printed material is satisfactory. It is noted that the print inspection is "ON" means to carry out a print inspection, and that the decoration inspection is "ON" means to carry out a decoration inspection. It is also noted that a color of a primary coating is "ON: Automatic" means to automatically carry out a decoration inspection in accordance with a color of a primary coating disposed under foil (i.e., color of a sheet at the foil-stamped region).

General Configuration of Scanned Image

With reference to FIG. 4, a general configuration of a scanned image of a printed material will be described. FIG. 4 is a view illustrating a scanned image IM80 of a printed material 80.

In the example of a printed material 80 shown in FIG. 4, a normal image 82 is printed on an overall surface of a sheet 81 and varnish is partly applied to the surface of the sheet 81, and further foil 85 is stamped on the surface of varnish 84. Accordingly, the surface of the printed material 80 has a foil-stamped image 86 formed of foil 85.

The image scanner 43 (see FIG. 2D) of the foil-stamped print inspection apparatus 40 emits illumination light Li1 from a light emission portion (not shown) to a surface of a printed material 80, and receives reflected light Li2 that is reflected off the surface of the printed material 80 using a line sensor (not shown). Accordingly, the foil-stamped print inspection apparatus 40 acquires a scanned image IM80 of the printed material 80. Further, the foil-stamped print inspection apparatus 40 inspects a normal image 82 of the printed material 80 and a state of foil 85 based on the scanned image IM80 thus acquired.

Preferably, the image scanner 43 (reading unit) of the foil-stamped print inspection apparatus 40 is configured to read the foil-stamped region of the printed material 80 and the normal region of the printed material 80 at one time using the line sensor (not shown).

The surface of the foil-stamped region on the printed material 80 is not flat and uneven because of the thickness of varnish 84 applied as adhesive and surface irregularities of the sheet 81. In other words, the surface of the foil 85 on the printed material 80 is uneven. For this reason, when the image scanner 43 (see FIG. 2D) of the foil-stamped print inspection apparatus 40 emits illumination light Li1 to the printed material 80, the reflected light Li2 reflects randomly at the surface of the foil 85 (in particular, at the surface of a curved portion of the foil 85). Accordingly, as seen in FIG. 4, the foil-stamped image 86 contained in the scanned image IM80 acquired by the foil-stamped print inspection apparatus 40 is not a uniform black image but a gray-colored image having a partly non-uniform portion at respective regions. In other words, the foil-stamped image 86 contained in the scanned image IM80 is a gray-colored image having non-uniform shades of gray.

The foil-stamped print inspection apparatus 40 determines that the foil 85 is satisfactory (the state of foil is satisfactory) if a partly non-uniform portion of the foil-stamped image 86 contained in the scanned image IM80 has a gray color within a predetermined range. In other words, the foil-stamped print inspection apparatus 40 determines that the foil 85 is satisfactory (the state of foil is satisfactory) if the foil-stamped image 86 contained in the scanned image IM80 has a gray level that falls within the predetermined range (e.g., "satisfactory range GRa" shown in FIG. 5).

Meanwhile, the foil-stamped print inspection apparatus 40 determines that the foil 85 is unsatisfactory (the state of foil is unsatisfactory) if a partly non-uniform portion of the foil-stamped image 86 contained in the scanned image IM80 has a gray color outside the predetermined range. In other words, the foil-stamped print inspection apparatus 40 determines that the foil 85 is unsatisfactory (the state of foil is unsatisfactory) if the foil-stamped image 86 contained in the scanned image IM80 has a gray level that falls outside the predetermined range (e.g., "satisfactory range GRa" shown in FIG. 5).

Figure 5:
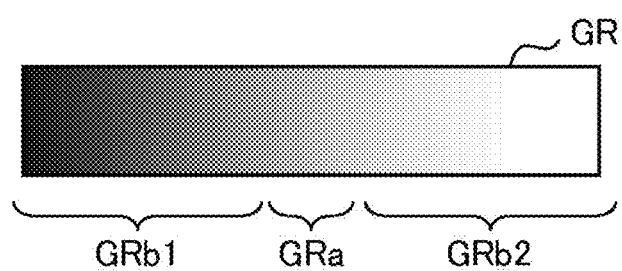
FIG. 5 is a view explaining gray-level-range data used as a determination criterion for determining a state of foil-stamped foil.

The foil-stamped print inspection apparatus 40 uses gray-level-range data such as shown in FIG. 5 as a determination criterion for determining the state of foil-stamped foil 85.

Brief Description of Gray-Level-Range Data

With reference to FIG. 5, gray-level-range data will be briefly described below. FIG. 5 is a view explaining gray-level-range data used as a determination criterion for determining the state of foil-stamped foil 85.

As seen in FIG. 5, the gray-level-range data GR has a predetermined width at a medial portion of the respective gray scales as a satisfactory range GRa. Further, the gray-level-range data GR has gray levels from black to the satisfactory range GRa as an unsatisfactory range GRb1, and gray levels from white to the satisfactory range GRa as an unsatisfactory range GRb2.

Is should be noted that the "satisfactory range GRa" corresponds to the above-described "predetermined range". The types of foils may indicate metallic foils such as gold foil, silver foil and other colored foils (e.g., red), and patterned foils with patterns. The gray levels of the scanned image vary in accordance with a type of foil. For this reason, it is preferable that the satisfactory range GRa is set to a predetermined range in accordance with the type of foil used. In other words, the gray-level-range data GR may be automatically generated based on the type of foil 85 used in the printed material 80. Namely, the foil-stamped print inspection system SYS may automatically produce the gray-level-range data GR based on the type of foil 85 used in the printed material 80.

The foil-stamped print inspection apparatus 40 determines that the foil 85 is satisfactory (the state of foil is satisfactory) if the foil-stamped image 86 falls within the satisfactory range GRa (i.e., the above-described "predetermined range"). In this instance, the foil-stamped print inspection apparatus 40 determines that the printed material is satisfactory.

Meanwhile, the foil-stamped print inspection apparatus 40 determines that the foil 85 is unsatisfactory (the state of foil is unsatisfactory) if the foil-stamped image 86 falls outside the satisfactory range GRa that is the above-described "predetermined range" (more specifically, the foil-stamped image 86 falls within the above-described unsatisfactory range GRb1 or within the above-described unsatisfactory range GRb2). In this instance, the foil-stamped print inspection apparatus 40 determines that the printed material is unsatisfactory.

Defective Examples: When Foil-Stamped Image is Determined as Unsatisfactory

Figure 6A:
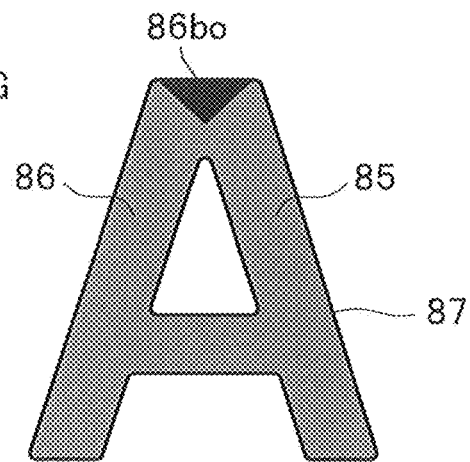
FIG. 6A is an explanatory view (1) of a foil-stamped image with a portion of the foil being chipped.
Figure 6B:
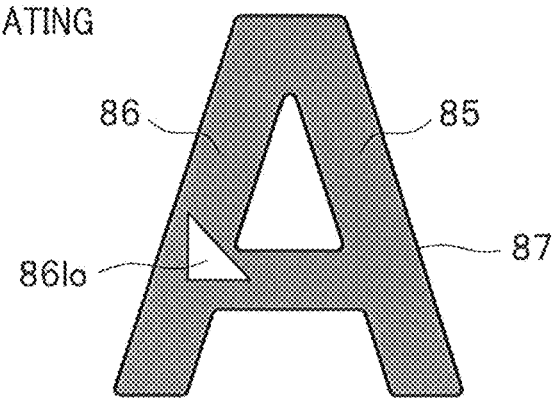
FIG. 6B is an explanatory view (2) of a foil-stamped image with a portion of the foil being chipped.
Figure 6C:
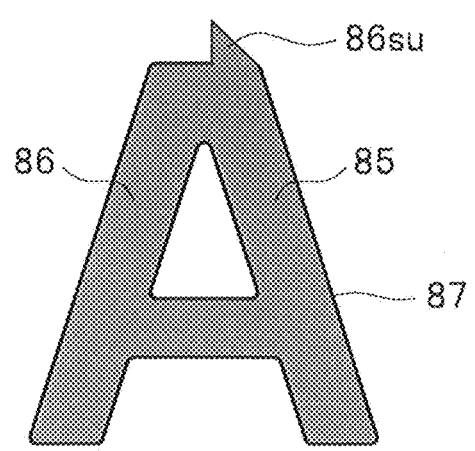
FIG. 6C is an explanatory view of a foil-stamped image with excessive foil.

With reference to FIGS. 6A, 6B, and 6C, typical examples when the foil-stamped image is determined as unsatisfactory will be briefly described below. FIGS. 6A and 6B are explanatory views each explaining the foil-stamped image 86 with a portion of the foil being chipped. FIG. 6C is an explanatory view explaining the foil-stamped image 86 with excessive foil.

In the example shown in FIG. 6A, the foil-stamped image 86 has a portion in which the foil 85 is chipped; at this chipped portion 86*lo*, a black-colored primary coating is exposed to view.

In the example shown in FIG. 6B, the foil-stamped image 86 has a portion in which the foil 85 is chipped; at this chipped portion 86*lo*, a white-colored primary coating is exposed to view.

In the example shown in FIG. 6C, the foil-stamped image 86 has a portion in which excessive foil 85 has been applied and an excess portion 86*su* of the foil 85 extends out from a regular foil-stamped region (to a surrounding adjacent region that is adjacent to the foil-stamped region).

The foil-stamped print inspection apparatus 40 determines for the all portions of the foil-stamped image 86 whether the gray level of the foil-stamped image 86 falls within the predetermined range (e.g., the "satisfactory range GRa" shown in FIG. 5) to inspect the state of the foil 85.

For example, if the foil-stamped image 86 has a defect such as shown in FIG. 6A, the chipped portion 86*lo* of the foil-stamped image 86 has a gray level that falls within the "unsatisfactory range GRb1" shown in FIG. 5. In other words, the chipped portion 86*lo* of the foil-stamped image 86 has a gray level that falls outside the predetermined range. Accordingly, the foil-stamped print inspection apparatus 40 determines that the foil is unsatisfactory and therefore determines that the printed material 80 is defective.

Similarly, for example, if the foil-stamped image 86 has a defect such as shown in FIG. 6B, the chipped portion 86*lo* of the foil-stamped image 86 has a gray level that falls within the "unsatisfactory range GRb2" shown in FIG. 5. In other words, the chipped portion 86*lo* of the foil-stamped image 86 has a gray level that falls outside the predetermined range. Accordingly, the foil-stamped print inspection apparatus 40 determines that the foil is unsatisfactory and therefore determines that the printed material 80 is defective.

If the color of the primary coating disposed under the foil 85 (i.e., color of the sheet) has a gray level closer to the gray level of the foil 85 that is read by the foil-stamped print inspection apparatus 40 (hereinafter simply referred to as a "gray level of the foil 85"), the foil-stamped print inspection apparatus 40 cannot detect the chipped portion 86lo. This is because the color of the primary coating disposed under the chipped portion 86lo (i.e., color of the sheet) has a gray level that is closer to the gray level of the foil 85.

For this reason, it is preferable that the foil-stamped print inspection system SYS is configured to print a primary coating image with a color having a gray level different from that of the foil 85 in advance on the primary coating portion for the foil 85. In other words, the foil-stamped print inspection system SYS may be configured such that the printer controller 10 causes the printer 20 to print a primary coating image with a color having a gray level different from that of the foil 85 in advance on the primary coating portion for the foil 85. For example, a color with a bright luminance, such as white and yellow, may be used as a color having a gray level different from that of the foil 85.

Further, the foil-stamped print inspection apparatus 40 determines whether the foil 85 extends to the surrounding adjacent region that is adjacent to the foil-stamped image 86 to inspect the state of foil 85.

For example, if the foil-stamped image 86 has a defect such as shown in FIG. 6C, an excess portion 86su of the foil-stamped image 86 extends to the adjacent region. Accordingly, the foil-stamped print inspection apparatus 40 determines that the foil is unsatisfactory and therefore determines that the printed material 80 is defective. The determination as to whether the foil 85 extends to the adjacent region is carried out, for example, by determining whether the shape of the normal image matches the shape of the correct image at a portion surrounding the foil-stamped image 86.

Figure 7:
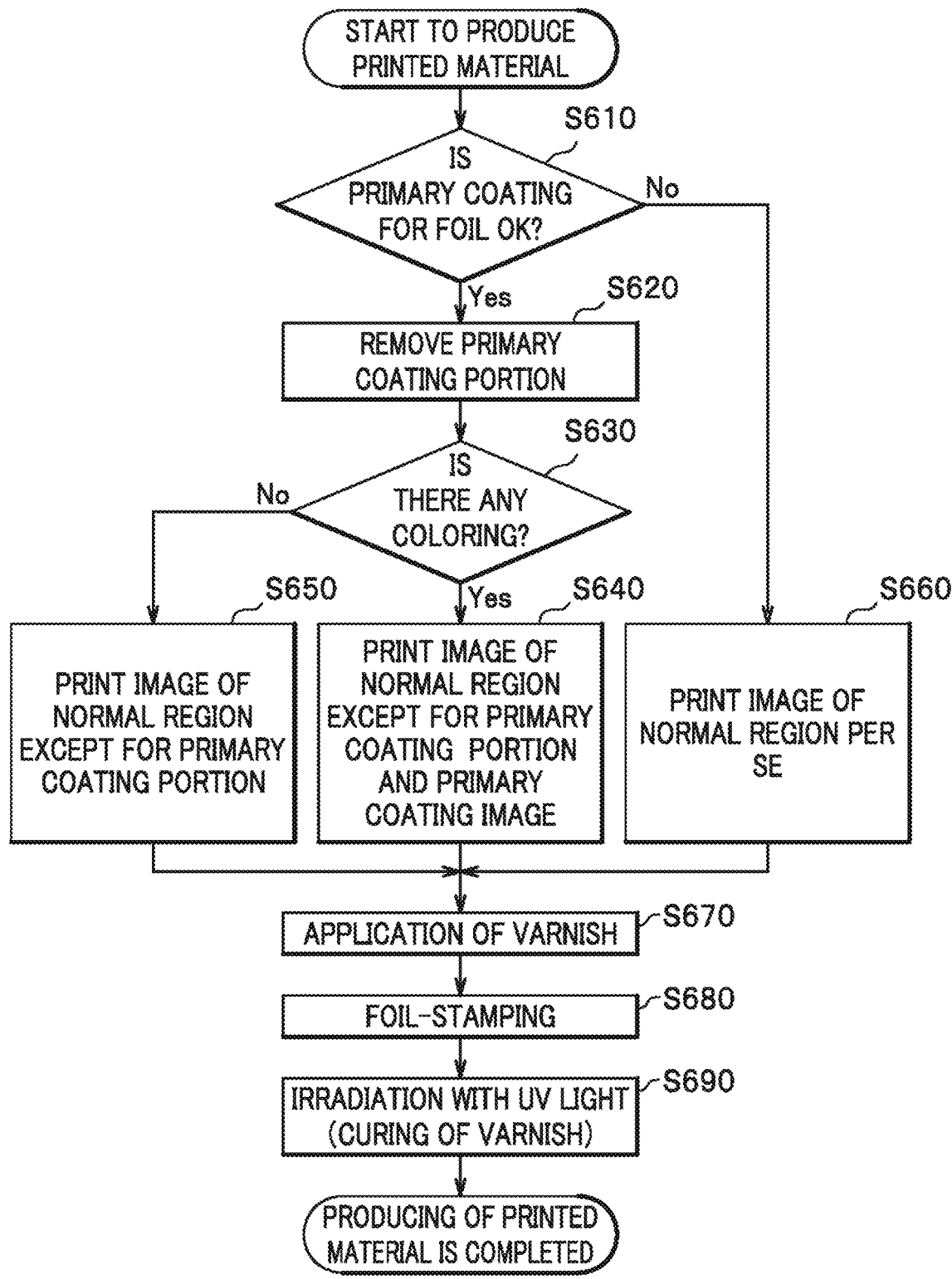
FIG. 7 is a flowchart illustrating the operation of the foil-stamped print inspection system according to this embodiment upon producing a printed material.
Figure 8A:
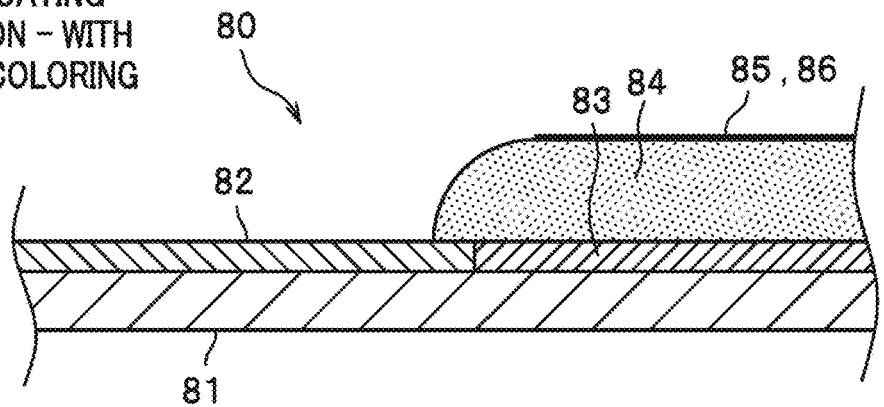
FIG. 8A is an explanatory view (1) of settings of a primary coating for foil.
Figure 8B:
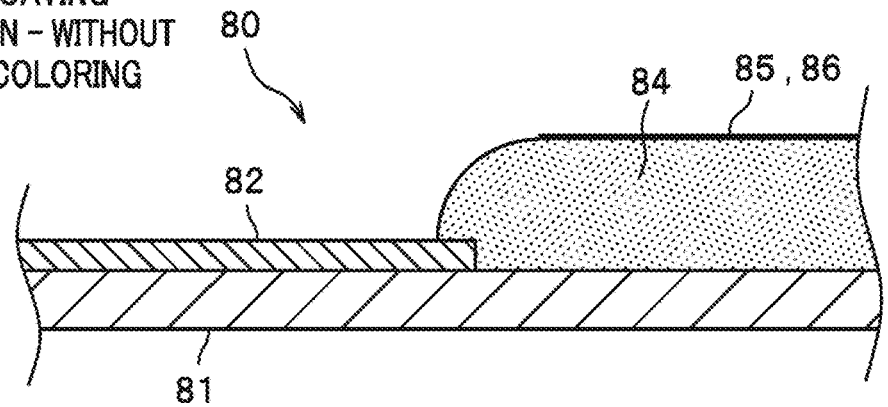
FIG. 8B is an explanatory view (2) of settings of a primary coating for foil.
Figure 8C:
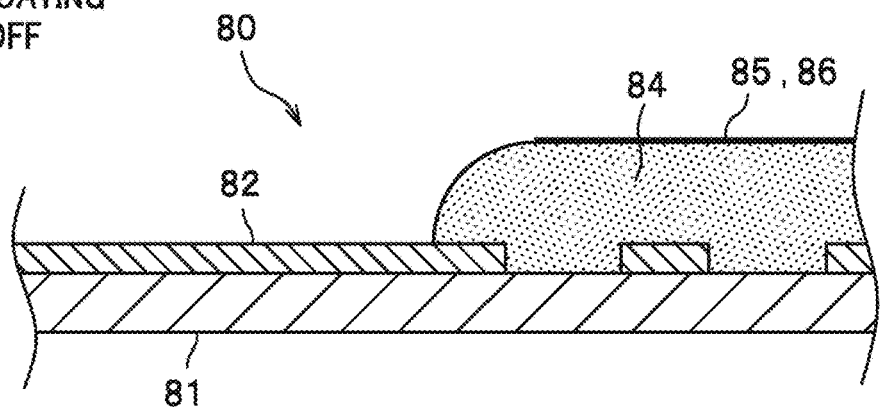
FIG. 8C is an explanatory view (3) of settings of a primary coating for foil.

Operation of Foil-Stamped Print Inspection System Upon Producing Printed Material With reference to FIGS. 7 and 8A to 8C, the operation of the foil-stamped print inspection system SYS upon producing a printed material will be described. FIG. 7 is a flowchart illustrating the operation of the foil-stamped print inspection system SYS upon producing a printed material. FIGS. 8A to 8C are explanatory views each explaining settings of a primary coating for foil.

As seen in FIG. 1, the foil-stamped print inspection system SYS according to this embodiment starts to produce a printed material when the printer controller 10 acquires job setting data Djb from the host apparatus UP.

In this embodiment, the job setting data Djb contains data, such as print setting data Dpr, decoration setting data Dor for foil-stamping and the like, and inspection setting data Dex. It is however noted that instead of the job setting data Djb containing the inspection setting data Dex, the inspection setting data Dex may be derived from the printer controller 10 or the foil-stamped print inspection apparatus 40 based on the job setting data Djb or other data.

As seen in FIG. 7, at the time of producing a printed material, the printer controller 10 of the foil-stamped print inspection system SYS first determines whether processing of a primary coating for foil is ON based on the job setting data Djb (step S610). The case where processing of a primary coating for foil is ON and the case where processing of a primary coating for foil is not ON (i.e., OFF) will be described later with reference made to FIGS. 8A to 8C.

If it is determined that processing of a primary coating for foil is ON at step S610 (i.e., determination at step S610 is "Yes"), the printer controller 10 changes contents of the date for printing to remove a primary coating portion from the data for printing contained in the print setting data Dpr (step S620).

After step S620, the printer controller 10 determines whether a coloring process is required for a primary coating for foil, based on the job setting data Djb (step S630).

Herein, the case where a coloring process is required for a primary coating for foil indicates the case where a primary coating image with a color having a gray level different from that of the foil 85 to be read by the foil-stamped print inspection apparatus 40 is printed on the primary coating portion for the foil 85. As described above, a color with a bright luminance, such as white and yellow, may preferably be used as a color having a gray level different from that of the foil 85.

If it is determined that a coloring process is required for a primary coating for foil (i.e., determination at step S630 is "Yes"), the printer controller 10 outputs to the printer 20 the print setting data Dpr containing a content of data for printing that instructs the printer 20 to print a primary coating image as well as a normal image except for the primary coating portion. In response, the printer controller 10 causes the printer 20 to print on a sheet a normal image except for the primary coating portion and a primary coating image with a color having a gray level different from that of the foil 85 (step S640).

Meanwhile, if it is determined that a coloring process is not required for a primary coating for foil (i.e., determination at step S630 is "No"), the printer controller 10 outputs to the printer 20 the print setting data Dpr containing a content of data for printing that instructs the printer 20 to print a normal image except for the primary coating portion. In response, the printer controller 10 causes the printer 20 to print on a sheet a normal image except for the primary coating portion (step S650).

Further, if it is determined that processing of a primary coating for foil is not ON at step S610 (i.e., determination at step S610 is "No"), the printer controller 10 outputs to the printer 20 the print setting data Dpr containing a content of data for printing that instructs the printer 20 to print a normal image. In response, the printer controller 10 causes the printer 20 to print on a sheet a normal image per se (step S660).

After step S640, step S650 or step S660, the printer controller 10 outputs to the foil-stamping apparatus 30 the decoration setting data Dor containing a content of data for decoration that instructs the foil-stamping apparatus 30 to form a predetermined shaped foil-stamped image in a foil-stamped region. In response, the printer controller 10 causes the foil-stamping apparatus 30 to apply varnish as adhesive in a foil-stamped region of a sheet (step S670), to perform foil-stamping on the varnish (step S680), and to cure the varnish by irradiating the sheet with ultraviolet light (step S690). Accordingly, the printed material is produced and the process for producing the printed material is completed.

With reference to FIGS. 8A to 8C, an explanation will be given to the case where it is determined at step S610 that processing of a primary coating for foil is ON and the case where it is determined at step S610 that processing of a primary coating for foil is not ON (i.e., OFF). Processing of a primary coating for foil is ON indicates that the process such as shown in FIG. 8A or FIG. 8B is carried out. Processing of a primary coating for foil is not ON (i.e., OFF) indicates that the process such as shown in FIG. 8C is carried out.

As seen in FIG. 8A, if processing of a primary coating for foil is ON and a coloring process is required for a primary coating for foil, the printer controller 10 changes contents of the date for printing contained in the print setting data Dpr so that the primary coating image is printed on the primary coating portion for the foil 85. The contents of the data for printing thus changed show that the normal image of the primary coating portion is removed and the primary coating image 83 with a color having a gray level different from that of the foil 85 is printed on the primary coating portion. Accordingly, at step S640 of FIG. 7, the printer 20 prints on a sheet the normal image except for the primary coating portion as well as prints on the primary coating portion the primary coating image 83 with a color having a gray level different from that of the foil 85 so as to fill in the primary coating portion with the primary coating image 83.

As seen in FIG. 8B, if processing of a primary coating for foil is ON and a coloring process is not required for a primary coating for foil, the printer controller 10 changes contents of the date for printing contained in the print setting data Dpr so that an image is not printed on the primary coating portion for the foil 85. The contents of the data for printing thus changed show that the normal image of the primary coating portion is removed. Accordingly, at step S650 of FIG. 7, the printer 20 prints on a sheet the normal image except for the primary coating portion with the primary coating portion being left unprinted.

Further, as seen in FIG. 8C, if processing of a primary coating for foil is OFF, the printer controller 10 maintains contents of the data for printing contained in the print setting data Dpr without changing the contents. Accordingly, at step S660 of FIG. 7, the printer 20 prints on a sheet the normal image per se that is instructed by the host apparatus UP.

Figure 9A:
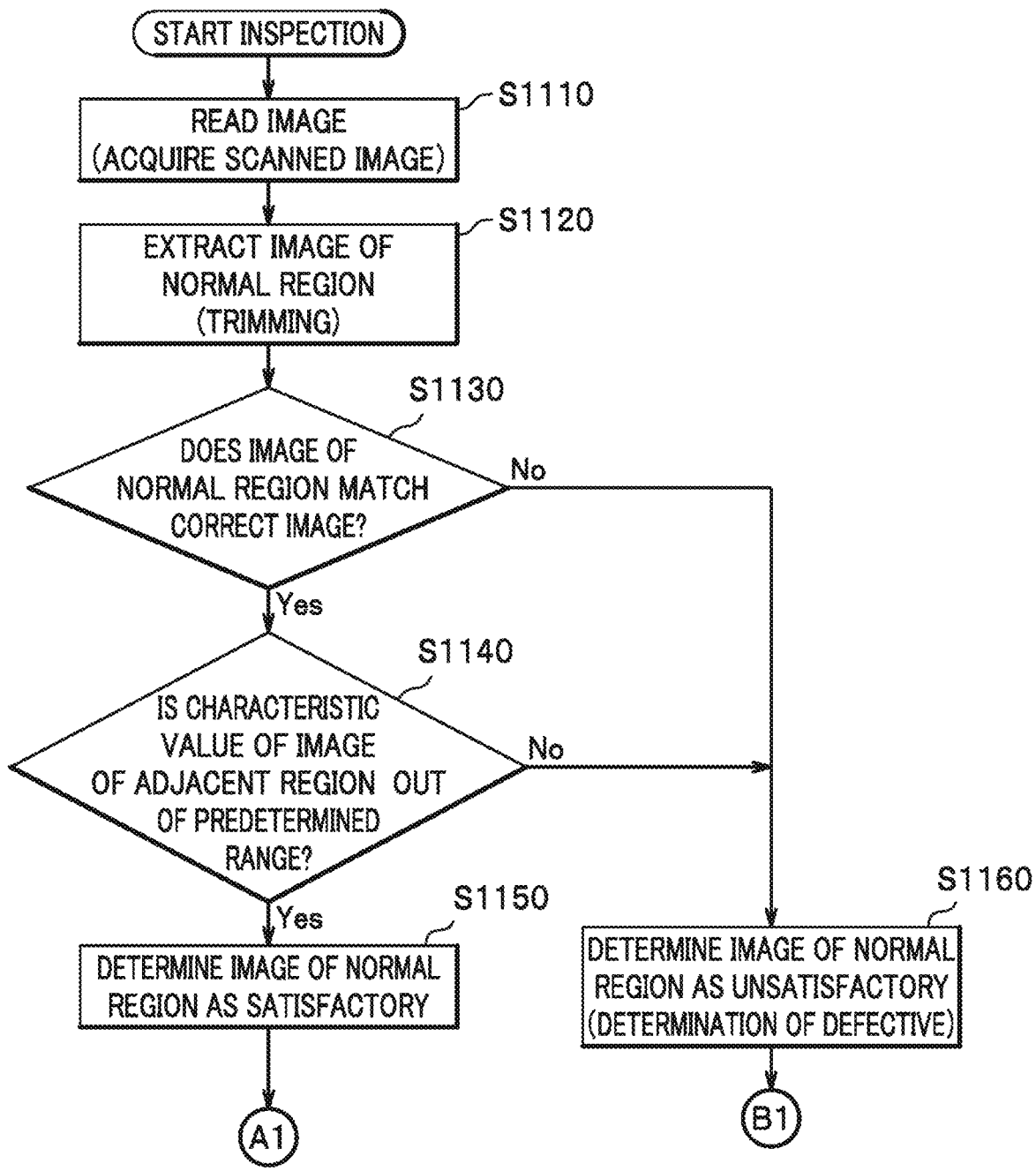
FIG. 9A is a flowchart (1) illustrating the operation of the foil-stamped print inspection system according to this embodiment upon inspecting a printed material.
Figure 9B:
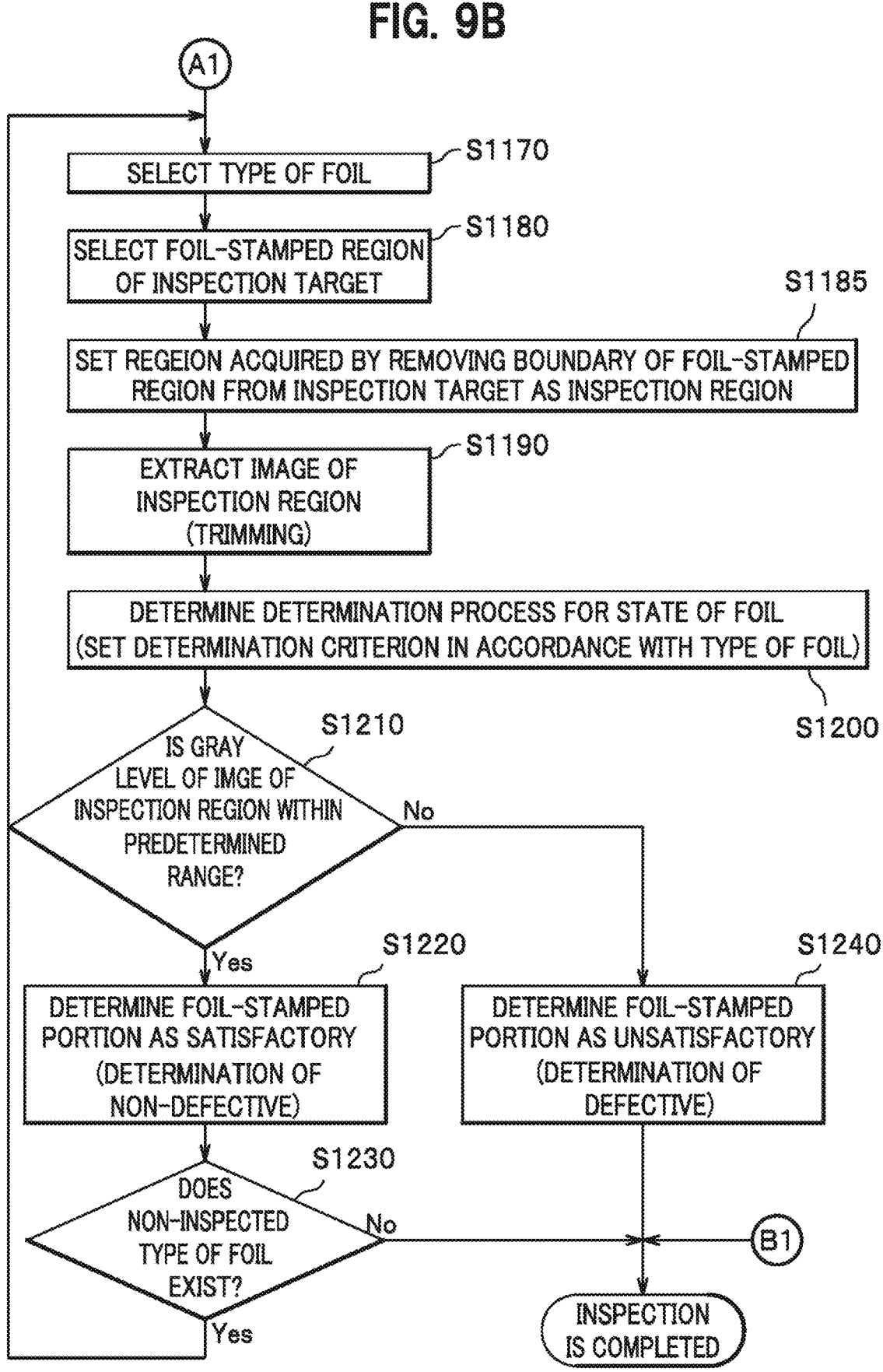
FIG. 9B is a flowchart (2) illustrating the operation of the foil-stamped print inspection system according to this embodiment upon inspecting a printed material.

Operation of Foil-Stamped Print Inspection System Upon Inspecting Printed Material With reference to FIGS. 9A and 9B, the operation of the foil-stamped print inspection system SYS upon inspecting a printed material will be described. FIGS. 9A and 9B are flowcharts each illustrating the operation of the foil-stamped print inspection system SYS upon inspecting a printed material.

In this embodiment, the foil-stamped print inspection system SYS operates to produce a printed material 80 and concurrently to inspect the printed material 80 by the printer controller 10 outputting inspection setting data Dex to the foil-stamped print inspection apparatus 40. In this embodiment, the inspection setting data Dex contains correct image data, foil type data, foil-stamped region data, and the like. Further, in this embodiment, only one type of foil 85 is foil-stamped by the foil-stamping apparatus 30

As seen in FIG. 9A, upon inspecting a printed material 80, the foil-stamped print inspection apparatus 40 reads an image of a foil-stamped printed material 80 using the image scanner 43 (reading unit) to acquire a scanned image (step S1110).

After step S1110, the region selecting unit 41a of the foil-stamped print inspection apparatus 40 (see FIG. 2D) extracts a normal image from the scanned image based on data for inspection contained in inspection setting data Dex (step S1120). At this time, the region selecting unit 41a extracts (trims to provide) a normal image by removing unnecessary surrounding portions.

After step S1120, the inspection unit 41z of the foil-stamped print inspection apparatus 40 (see FIG. 2D) acquires a correct image from correct image data contained in the inspection setting data Dex. The inspection unit 41z then compares the normal image and the correct image to determine whether the normal image matches the correct image (step S1130).

If it is determined that the normal image matches the correct image at step S1130 (i.e., determination at step S1130 is "Yes"), the inspection unit 41z determines whether a gray level of an image on an adjacent region adjacent to the foil-stamped region (hereinafter referred to as an "adjacent image") falls outside a predetermined range (step S1140). The determination at step S1140 is carried out to distinguish that as seen in FIG. 6C, excessive amounts of foil 85 are supplied and an excess portion 86su of the foil 85 extends from a regular foil-stamped region to a surrounding adjacent region.

If it is determined that the gray level of the adjacent image falls outside the predetermined range at step S1140 (i.e., determination at step S1140 is "Yes"), the inspection unit 41z determines that the normal image is satisfactory (step S1150). In this instance, operation proceeds to step S1170 of FIG. 9B (see reference numeral A1).

At this step, the inspection unit 41z does not determine (judge) that the printed material 80 is satisfactory, but if the determination at step S1210 of FIG. 9B is "Yes", then the inspection unit 41z determines (judges) that the printed material 80 is satisfactory. In other words, if the determination at step S1140 of FIG. 9A and the determination at step S1210 of FIG. 9B are both "Yes", the inspection unit 41z determines (judges) that the printed material 80 is satisfactory.

If it is determined that the normal image does not match the correct image at step S1130 (i.e., determination at step S1130 is "No"), the inspection unit 41z determines that the normal image is unsatisfactory (printed material is defective) (step S1160). In this instance, the process for inspecting a printed material 80 is completed (see reference numeral B1).

Further, if it is determined that the gray level of the adjacent image is not outside the predetermined range (namely, within the predetermined range) (i.e., determination at step S1140 is "No"), the inspection unit 41z determines that the foil 85 has been excessively supplied (see FIG. 6C) and thus the normal image is unsatisfactory (printed material is defective) (step S1160).

As seen in FIG. 9B, after step S1150 of FIG. 9A, the type selecting unit 41b of the foil-stamped print inspection apparatus 40 (see FIG. 2D) selects a type of foil 85 of the inspection target if plural types of foils 85 are foil-stamped (step S1170). In this embodiment, because only one type of foil 85 is foil-stamped by the foil-stamping apparatus 30, the type selecting unit 41b automatically selects the corresponding type of foil 85.

After step S1170, the region selecting unit 41a of the foil-stamped print inspection apparatus 40 (see FIG. 2D) selects the foil-stamped region of the inspection target among one or more foil-stamped regions defined in the data for inspection, based on the data for inspection contained in the inspection setting data Dex (step S1180).

After step S1180, the region selecting unit 41a sets the region that is acquired by removing the boundary of the foil-stamped region from the inspection target as the inspection region (step S1185). This process is carried out for the purpose of removing a boundary as a non-detected region because a boundary of a foil-stamped region is a distorted portion having a higher probability of not being determinable. Preferably, the width of the "non-detected region" is changed in accordance with the thickness of varnish 84 applied under the foil 85. The "non-detected region" will be describe later with reference to FIG. 10 and FIGS. 11A to 11B.

After step S1185, the region selecting unit 41*a* extracts the image of the inspection region that is set at step S1185 from the scanned image (step S1190). At this time, the region selecting unit 41*a* extracts (trims to prove) an image of the inspection region by removing unnecessary surrounding portions.

After step S1190, the setting unit 41*c* of the foil-stamped print inspection apparatus 40 (see FIG. 2D) determines a determination process for a state of foil 85 based on the inspection setting data Dex (step S1200). At this time, the setting unit 41*c* sets a determination criterion in accordance with a type of foil 85 based on the control program ex. The determination criterion may be appropriately set in accordance with an operation. For example, the setting unit 41*c* may set "gray-level-range data GR" shown in FIG. 5 as the determination criterion in accordance with a type of foil 85.

Is should be noted that the operation at step S1200 may be carried out at any desired timing prior to any of steps S1110 to S1190. Further, it should be noted that instead of the foil-stamped print inspection apparatus 40 setting the determination criterion for determining the state of foil 85, the printer controller 10 or the host apparatus UP may set the determination criterion for determining the state of foil 85.

After step S1200, the inspection unit 41*z* of the foil-stamped print inspection apparatus 40 (see FIG. 2D) determines for the all portions of the inspection region whether the gray level of the image of the inspection region falls within the predetermined range (i.e., "satisfactory range GRa" shown in FIG. 5) (step S1210).

If it is determined that the gray level of the image of the inspection region falls within the predetermined range (i.e., "satisfactory range GRa" shown in FIG. 5) for all the portions at step S1210 (i.e., determination at step S1210 is "Yes"), the inspection unit 41*z* determines that the foil 85 is satisfactory (printed material is non-defective) (step S1220).

After step S1220, the inspection unit 41*z* (or a functional unit (not shown) of the foil-stamped print inspection apparatus 40) determines whether a non-inspected type of foil exists (step S1230).

If it is determined that a non-inspected type of foil exists at step S1230 (i.e., determination at step S1230 is "Yes"), operation returns to step S1170. If it is determined that a non-inspected type of decoration does not exist at step S1230 (i.e., determination at step S1230 is "No"), then the process for inspecting the printed material 80 is completed.

If it is determined that the gray level of the image of the inspection region does not fall within the predetermined range (i.e., "satisfactory range GRa" shown in FIG. 5) for any of the portions at step S1210 (i.e., determination at step S1210 is "No"), the inspection unit 41*z* determines that a portion of the foil 85 is chipped (see FIGS. 6A and 6B) and thus the foil 85 is unsatisfactory (printed material is defective) (step S1240). Accordingly, the process for inspecting the printed material 80 is completed.

Non-Detected Region of Printed Material

Figure 10:
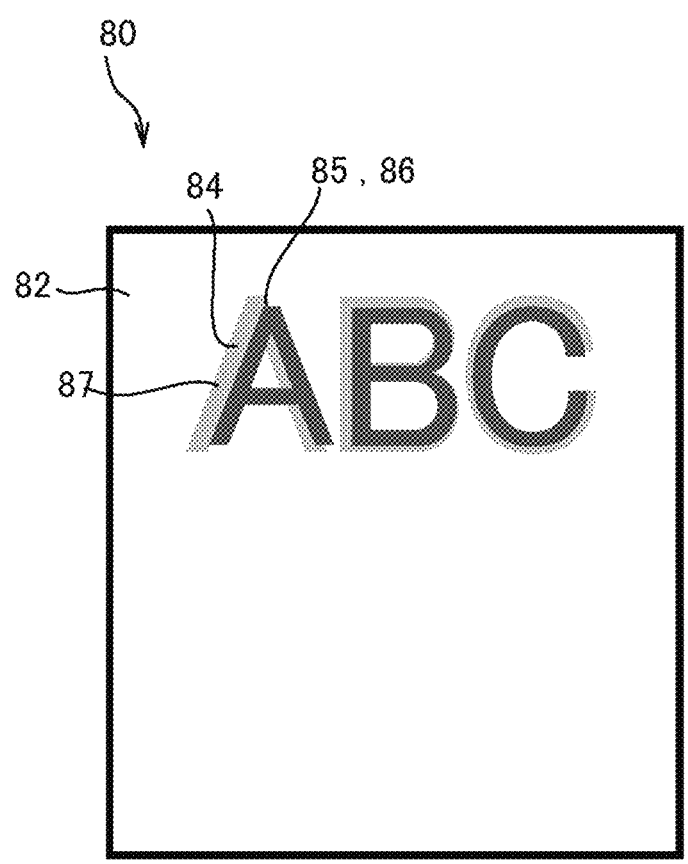
FIG. 10 is a view explaining a printed material.
Figure 11A:
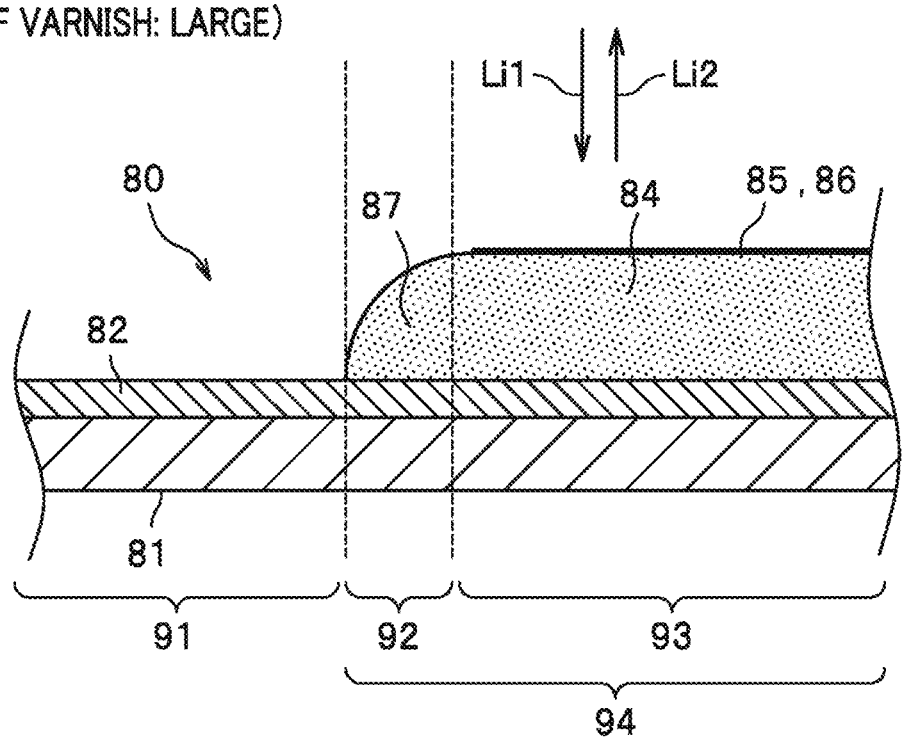
FIG. 11A is a view (1) illustrating a non-detected region of a printed material.
Figure 11B:
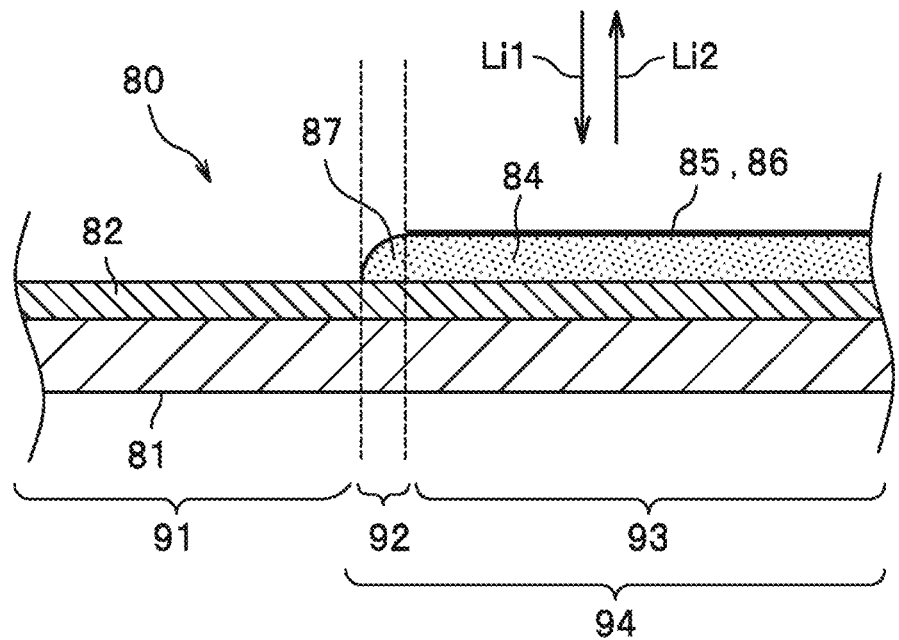
FIG. 11B is a view (2) illustrating a non-detected region of a printed material.

With reference to FIG. 10 and FIGS. 11A to 11B, a non-detected region 92 of a printed material 80 will be briefly described. FIG. 10 is a view explaining a printed material 80. FIGS. 11A and 11B are views each illustrating a non-detected region 92 of a printed material 80.

FIG. 10 shows a surface of a printed material 80 as viewed from above. In the example shown in FIG. 10, a normal image 82 and a foil-stamped image 86 are formed on the surface of the printed material 80. The normal image 82 is formed generally entirely on the surface of the sheet 81. In contrast, a foil-stamped image 86 is formed on a desired portion of the sheet 81 and includes a character "A", a character "B", and a character "C". The foil-stamped image 86 is formed by applying varnish 84 to the surface of the sheet 81, stamping the foil 85 to the surface of the varnish 84, and curing the varnish 84.

At the boundary 87 of the foil-stamped region, varnish 84 is partly exposed from the foil 85. When the foil-stamped print inspection apparatus 40 reads the image of the printed material 80, the reflected light Li2 reflects randomly at the boundary 87. For this reason, the gray level of the boundary 87 that is read by the foil-stamped print inspection apparatus 40 shifts toward white. This may result in a false detection of a boundary portion between the foil-stamped image 86 and the normal image 82 at the boundary 87. In other words, the inspection unit 41*z* of the foil-stamped print inspection apparatus 40 (see FIG. 2D) may disadvantageously determine that the gray level of the foil-stamped image 86 at the boundary 87 falls outside the predetermined range and thus determine that the foil 85 is unsatisfactory (the state of foil is unsatisfactory).

To this end, as seen in FIGS. 11A and 11B, at the time of determining the state of the foil 85, the foil-stamped print inspection apparatus 40 preferably sets the region of the boundary 87 as a non-detected region 92, and then sets a region acquired by removing the non-detected region 92 from the foil-stamped region 94 of the inspection target as an inspection region 93. Further, the foil-stamped print inspection apparatus 40 preferably determines the state of the foil 85 based on the inspection region 93.

As seen in FIGS. 11A and 11B, the foil-stamped print inspection apparatus 40 preferably changes the width of the non-detected region 92 in accordance with the thickness of the varnish 84.

For example, as seen in FIG. 11A, if the thickness of the varnish 84 is relatively large, the width of the boundary 87 is relatively wide. In this instance, the foil-stamped print inspection apparatus 40 sets the width of the non-detected region 92 to be relatively wide.

Meanwhile, as seen in FIG. 11B, if the thickness of the varnish 84 is relatively small, the width of the boundary 87 is relatively narrow. In this instance, the foil-stamped print inspection apparatus 40 sets the width of the non-detected region 92 to be relatively narrow.

Main Features of Foil-Stamped Print Inspection Apparatus and Foil-Stamped Print Inspection System The foil-stamped print inspection apparatus 40 and the foil-stamped print inspection system SYS according to this embodiment have the following features:

(1) The inspection unit 41*z* of the foil-stamped print inspection apparatus 40 according to this embodiment determines that the foil is unsatisfactory if it is determined that the gray level of the foil-stamped image falls outside the predetermined range (i.e., determination at step S1210 of FIG. 9B is "No"). With this configuration, the foil-stamped print inspection apparatus 40 according to this embodiment can perform an inspection of the printed material 80 in an appropriate manner with an inexpensive and relatively simple structure thereof.

(2) The inspection unit 41*z* of the foil-stamped print inspection apparatus 40 according to this embodiment determines that the foil is unsatisfactory if it is determined that the gray level of the adjacent image falls within the predetermined range (i.e., determination at step S1140 of FIG. 9A is "No"). Also, with this configuration, the foil-stamped print inspection apparatus 40 according to this embodiment can perform an inspection of the printed material 80 in an appropriate manner with an inexpensive and relatively simple structure thereof.

(3) The region selecting unit 41a of the foil-stamped print inspection apparatus 40 according to this embodiment extracts from the inspection target a region obtained by removing the boundary of the foil-stamped region that is a non-inspected region having a higher probability of not being determinable to acquire an inspection region (see step S1190 of FIG. 9B). The inspection unit 41z of the foil-stamped print inspection apparatus 40 then inspects the state of the foil 85 at the inspection region. With this configuration, the foil-stamped print inspection apparatus 40 according to this embodiment can suppress a false detection of the boundary portion between the foil-stamped image 86 and the normal image 82, and therefore inspect the state of the foil 85 in an appropriate manner.

(4) As seen in FIGS. 11A and 11B, the width of the non-detected region 92 may preferably be changed in accordance with the thickness of the varnish 84 applied under the foil 85. With this configuration, the foil-stamped print inspection apparatus 40 according to this embodiment can suppress a false detection of the boundary portion between the foil-stamped image 86 and the normal image 82, and therefore inspect the state of the foil 85 in an appropriate manner.

As described above, the foil-stamped print inspection system SYS according to this embodiment can perform an inspection of the printed material 80 in an appropriate manner with an inexpensive and relatively simple structure thereof.

Although one embodiment of the present invention has been described and illustrated in detail, the disclosed embodiment is made for purposes of illustration and example only and the present invention is not limited to the specific configurations of the above-described embodiment. It is to be understood that various changes or modifications may be made to any of the specific configurations without departing from the scope of the present invention.

For example, the above-described embodiment has been made for the purpose of readily understanding the gist of the present invention. Therefore, the present invention is not limited to the specific configuration including all the described elements. Further, it is to be understood that the configurations of the above-described embodiment may be changed or modified by partly adding or deleting a component or replacing a component with another component.

For example, the foil-stamped print inspection system SYS according to the above embodiment includes a printer controller 10, a printer 20, a foil-stamping apparatus 30, and a foil-stamped print inspection apparatus 40, which are configured respectively as separate and distinct apparatuses. However, each of these apparatuses may be integrated to another apparatus.

Further, in the above-described embodiment, the gray-level-range data GR shown in FIG. 5 is automatically produced based on the type of foil 85 used in the printed material 80. In other words, the foil-stamped print inspection system SYS automatically produces the gray-level-range data GR as shown in FIG. 5 based on the type of foil 85 used in the printed material 80.

However, the gray-level-range data GR as shown in FIG. 5 may be automatically produced based on the scanned image. In other words, the foil-stamped print inspection system SYS may automatically produce the gray-level-range data GR shown in FIG. 5 from the scanned image.

Further, in the above-described embodiment, the region selecting unit 41a of the foil-stamped print inspection apparatus 40 acquires inspection setting data Dex from the printer controller 10, and extracts the foil-stamped image from the scanned image based on the inspection setting data Dex thus acquired.

However, the region selecting unit 41a of the foil-stamped print inspection apparatus 40 may acquire decoration setting data Dor regarding foil-stamping from the printer controller 10, and extract the foil-stamped image from the scanned image based on the decoration setting data Dor thus acquired.

As an alternative, the region selecting unit 41a of the foil-stamped print inspection apparatus 40 may acquire data for the foil-stamped region from the foil-stamping apparatus 30, and extract the foil-stamped image from the scanned image based on the data for the foil-stamped region thus acquired.

As a further alternative, the region selecting unit 41a of the foil-stamped print inspection apparatus 40 may acquire data for the foil-stamped region from a marker (not shown) provided on the printed material 80, and extract the foil-stamped image from the scanned image based on the data for the foil-stamped region thus acquired.

Further, the predetermined range of gray levels used for determining whether the foil 85 is satisfactory may be calculated based on the type of foil used in the printed material 80.

As an alternative, the predetermined range of gray levels used for determining whether the foil 85 is satisfactory may be calculated based on a scanned image acquired by reading a foil-stamped medium.

The invention claimed is:

1. A foil-stamped print inspection apparatus comprising:
a region selecting unit that selects a foil-stamped region; and
an inspection unit that inspects a foil-stamped state of a printed material and determines whether foil is unsatisfactory based on a gray level of the foil-stamped region in an image acquired by reading the printed material,
wherein in response to determining that the gray level falls outside a predetermined range, the inspection unit determines that the foil is unsatisfactory.

2. The foil-stamped print inspection apparatus according to claim 1, wherein the inspection unit determines that the foil is unsatisfactory if a region adjacent to the foil-stamped region has a gray level that falls within a predetermined range.

3. The foil-stamped print inspection apparatus according to claim 1, wherein the region selecting unit removes a boundary of the foil-stamped region in the image acquired by reading the printed material from an inspection target of the inspection unit.

4. The foil-stamped print inspection apparatus according to claim 3, wherein a width of the boundary is changed in accordance with a thickness of varnish applied under the foil.

5. The foil-stamped print inspection apparatus according to claim 1, wherein the predetermined range of gray levels for determining whether the foil is satisfactory is calculated based on a type of foil used in the printed material.

6. The foil-stamped print inspection apparatus according to claim 1, wherein the predetermined range of gray levels for determining whether the foil is satisfactory is calculated based on an image that is acquired by reading a foil-stamped medium.

7. The foil-stamped print inspection apparatus according to claim 1, further comprising an optical sensor, wherein an image of the printed material to be inspected by the inspection unit contains a region to which foil-stamping has been applied by a foil-stamping apparatus and a region to which a normal image has been printed by a printer, which regions are read at one time by the optical sensor.

8. A foil-stamped print inspection system comprising:
a printer that prints an image on a medium;
a foil-stamping apparatus that applies foil-stamping on the medium; and
the foil-stamped print inspection apparatus according to claim 1, wherein the printer prints a foil-stamped region of the printed material with a color having a gray level that is different from the predetermined range of gray levels.

9. The foil-stamped print inspection apparatus according to claim 1, wherein the region selecting unit selects the foil-stamped region based on data for inspection for the printed material.

10. The foil-stamped print inspection apparatus according to claim 9, wherein the data for inspection is received from a foil-stamping apparatus that applies foil-stamping on the printed material or a controller that controls the foil-stamping apparatus.

11. The foil-stamped print inspection apparatus according to claim 9, wherein the data for inspection is acquired by reading a marker printed on the printed material.

12. A method of inspecting foil-stamped print comprising:
selecting, by a region selecting unit, of a foil-stamped print inspection apparatus, a foil-stamped region; and
inspecting, by an inspection unit of the foil-stamped print inspection apparatus, a foil-stamped state of a printed material and determining whether foil is unsatisfactory based on a gray level of the foil-stamped region in an image acquired by reading the printed material,
wherein in response to determining that the gray level falls outside a predetermined range, determining, by the inspection unit, that the foil is unsatisfactory.

13. The method of inspecting foil-stamped print according to claim 12, wherein the region selecting unit selects the foil-stamped region based on data for inspection for the printed material.

14. A non-transitory computer-readable storage medium storing a program for causing a computer to perform:
a region selection processing of selecting a foil-stamped region; and
an inspection processing of inspecting a foil-stamped state of a printed material and determining whether foil is unsatisfactory based on a gray level of the foil-stamped region in an image acquired by reading the printed material,
wherein in response to determining that the gray level falls outside a predetermined range, determining that the foil is unsatisfactory.

15. The non-transitory computer-readable storage medium according to claim 14, wherein the program causes the computer to select the foil-stamped region based on data for inspection for the printed material.

* * * * *